(12) United States Patent
Kang

(10) Patent No.: US 6,279,118 B1
(45) Date of Patent: Aug. 21, 2001

(54) RECORDING MEDIUM STORING ADDITIONAL INFORMATION FOR DEFECT MANAGEMENT AND METHOD FOR MANAGING DEFECTS

(75) Inventor: Jung-suk Kang, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/145,256

(22) Filed: Sep. 2, 1998

(30) Foreign Application Priority Data

Mar. 19, 1998 (KR) .................................................. 98-9489

(51) Int. Cl.[7] .................................................. G06F 11/00
(52) U.S. Cl. .................................................. 714/7; 711/114
(58) Field of Search .................................................. 714/7, 8, 5, 6, 714/13, 25, 30, 39, 41, 42, 44, 45, 54; 711/114, 115, 133, 159, 162

(56) References Cited

U.S. PATENT DOCUMENTS

| | | | |
|---|---|---|---|
| 4,937,804 | * 6/1990 | Ishihara | 369/48 |
| 5,068,842 | * 11/1991 | Naito | 369/32 |
| 5,111,444 | * 5/1992 | Fukushima et al. | 369/58 |
| 5,237,553 | * 8/1993 | Fakushima et al. | 369/58 |
| 5,270,877 | * 12/1993 | Fukushima et al. | 360/48 |
| 5,404,357 | * 4/1995 | Ito et al. | 371/21.2 |
| 5,414,689 | * 5/1995 | Maeda et al. | 369/116 |
| 5,701,304 | * 12/1997 | Glover et al. | 371/10.2 |
| 5,740,358 | * 4/1998 | Geldman et al. | 395/184.01 |
| 5,751,733 | * 5/1998 | Glover | 371/40.3 |
| 5,844,911 | * 12/1998 | Schadegg et al. | 371/10.2 |
| 5,844,919 | * 12/1998 | Glover et al. | 371/40.14 |
| 5,872,800 | * 2/1999 | Glover et al. | 371/40.4 |

OTHER PUBLICATIONS

Omura et al, composite image forming device, JPAB, West database, Pub. #JP407049939A, 1–1, Feb. 1995.*

Hitachi, Optical disc data memory—has validy status code plags assigned to each block enabling error–detection and correction, DWPI database, ACC. #1985–091154, 1–2, Jul. 1997.*

Sasaki et al, Information recording medium, Defect control method and its device, reproducing device and recording device, JPAB, West databases, Pub. #JP02000195183A, 1–1, Apr. 2000.*

* cited by examiner

Primary Examiner—Nadeem Iqbal
(74) Attorney, Agent, or Firm—Sughrue, Mion, Macpeak & Seas, PLLC

(57) ABSTRACT

Recording medium storing an additional information for defect management and a method for managing defects are disclosed. The method includes the steps of processing a defective data block during checking for defects of the recording medium where A/V data is recorded in a reference block unit of a predetermined size, using a predetermined defect management method, and moving the reference block including the defective data block to an unused area from a user area, and recording additional information for managing defects of the reference block moved to the unused area on a predetermined information area of the recording medium. Thus, defects are independently managed during recording and reproduction of video and audio data on a rewritable recording medium, to thereby ensure real-time reproduction without changing the method for managing defects which are physical regulations of the recording medium.

12 Claims, 2 Drawing Sheets

RECORDING MEDIUM STORING ADDITIONAL INFORMATION FOR DEFECT MANAGEMENT AND METHOD FOR MANAGING DEFECTS

BACKGROUND OF THE INVENTION

1. Field of the Invention

The present invention relates managing defects in optical recording/reproduction, and more particularly, to a recording medium on which audio and/or video (A/V) data is recorded, stores additional information for defect management, and to a method for managing defects.

2. Description of the Related Art

When data is recorded on a rewritable medium such as a digital versatile disc random access memory (DVD-RAM), the medium may be damaged due to repeated writings and readings, thereby reducing the life of the medium. Furthermore, defects may be caused by fingerprints, scratch or dust.

The above defects cause loss of the data which is recorded on the medium. Therefore, data stored in an area that may become damaged must be moved to an area that is not damaged, and the area that may become damaged is no longer used. This process is called defect management. However, typical defect management in which data of a defective area is moved to another area when A/V data, different from computer data, is recorded on the rewritable medium, causes physical discontinuity of the recorded data which results in a negative influence on real-time recording and reproducing of the A/V data.

The defect management of a typical DVD-DRAM will be described with reference to FIGS. 1 and 2. Referring to FIGS. 1A and 1B, slipping replacement is a defect management method used for managing a defective area found in initialization of a disc (i.e., when the disc is formatted). A user area is a freely rewritable area of the DVD-RAM disc, and a spare area for defect management is controlled by a system, and thus it cannot be arbitrarily used by a user.

A physical sector number coincides with a logical sector number in a bare disc shown in FIG. 1A. When data is recorded on the empty disc, i.e., the disc is formatted, defective sectors m and n shown in FIG. 1B are not used in a process of defect management for checking whether the user area has an error. No logical sector numbers are assigned to the defective sectors m and n, so that the disc is processed as not having any defective sectors. Further, a portion of the spare area having the size corresponding to the size of the defective sectors is used to record the data. Positions of the defective sectors are recorded on a primary defect list (PDL) area of a system area of the disc to be managed defects.

Meanwhile, linear replacement as shown in FIG. 2 is for the defect area found in the process of defect management when data of a desired program (or title) is recorded on the disc where data is recorded. That is, in linear replacement, the spare area is replaced with logical sector numbers assigned to error correction code (ECC) blocks (here, m and n data blocks) having the defective sectors, to record corresponding data to be recorded on the defect area position. Here, the ECC block is a data block of a 16 sector unit. Also, information for the defective ECC block includes a start sector number of the ECC block having a corresponding defective sector and a start sector number of the ECC block of a replaced spare area, and the information is recorded on a secondary defect list (SDL) area of the system area of the disc.

However, by the defect management method, in which the defect area shown in FIG. 2 is replaced with the spare area, physical discontinuity is generated when the A/V data is recorded and reproduced, is not conducive to real-time recording and reproducing. That is, if the A/V data is recorded or reproduced on the user area where the defect management process has been performed, data arriving at a defective block m is sought to a replacement block m located in the spare area and then recorded and reproduced, and further sought to a next block of the defective block m of the user area to be resumed recording and reproducing, so that seek time is twice as long for one defective block, which is not conducive to real-time recording and reproduction of A/V data.

SUMMARY OF THE INVENTION

To solve the above problem, it is an objective of the present invention to provide a recording medium which stores additional information for managing defects of a moved reference block, allowing replacement of a defective error correction code (ECC) block by conventional defect management, and moving a reference block including the defective ECC block to an unused area.

It is another objective of the present invention to provide a defect management method which is compatible with conventional defect management methods, and suitable for realtime recording and reproduction of A/V data.

Accordingly, to achieve the first objective, there is provided a rewritable recording medium having a user area where audio and/or video (A/V) data is recorded and a spare area for managing defects, wherein in a defect management process for checking whether an error is detected from a recording medium where the A/V data is recorded in a reference block unit of a predetermined size, the defective data block is moved to the spare area by a predetermined defect management method, the reference block including the defective data block is moved to an unused area, and additional information for managing defects of the reference block moved to the unused area is stored in a predetermined information area.

To achieve the second objective, there is provided a method for managing defects while recording and reproduction of audio and/or video (A/V) data on a rewritable recording medium, comprising the steps of: processing a defective data block during checking for defects of the recording medium where the A/V data is recorded in a reference block unit of a predetermined size, in a predetermined defect management method; and moving the reference block including the defective data block to an unused area from a user area, and recording additional information for managing defects of the reference block moved to the unused area on a predetermined information area of the recording medium.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

In a rewritable medium such as a DVD-RAM disc, writable areas are sporadically located on the disc due to deletion of recorded data and repeated rewriting of data. Accordingly, the writable areas are physically discontinuous so that logically continuous A/V data must be recorded in real time on the physically discontinuous area. Further, the recorded A/V data is edited, and thus logically continuous A/V data may be physically discontinuous. Here, real-time reproduction is an important consideration.

Physical discontinuities of a small unit, such as in an auxiliary memory for a computer, require multiple seeking operations in recording and reproduction, so that real-time reproducing cannot be performed.

Thus, in order to process A/V data in real-time, a method may be used in which a reference block of the predetermined size is set and recording and reproduction are performed in units of reference blocks. Here, even physical discontinuity occurs in units of reference blocks. The reference block includes a predetermined number of sectors p which is more than the number of sectors of an ECC block and is determined with reference to a bit rate of data in recording and reproduction, a seek time depending on mechanical performance of a driving system driving a medium, and the amount of information stored in a buffer for recording and reproduction. Here, while the reference block is read out from the disc to be reproduced, for example, reproduction of other physically discontinuous reference blocks have no effect on real-time reproduction. This means that more data than the predetermined size is stored in a buffer so that the buffer has as much data as time loss generated in seeking can be compensated for.

A method for managing defects according to the present invention in which video and audio data are recorded in units of reference blocks to be reproduced in real time will be described with reference to FIG. 3.

Figure 1A:
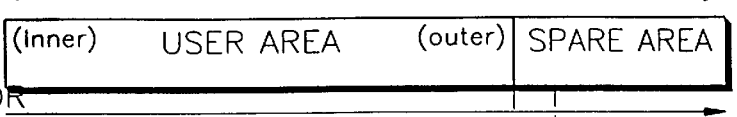
FIG. 1A & FIG. 1B are diagrams illustrating conventional defect management using slipping replacement in a general DVD-RAM disc.
Figure 1B:
Figure 2:
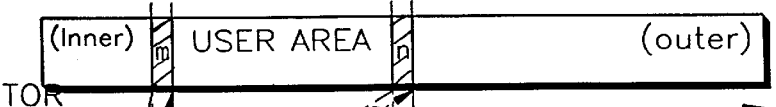
FIG. 2 is a diagram illustrating conventional defect management using linear replacement in a general DVD-RAM disc.
Figure 2:
Figure 3:
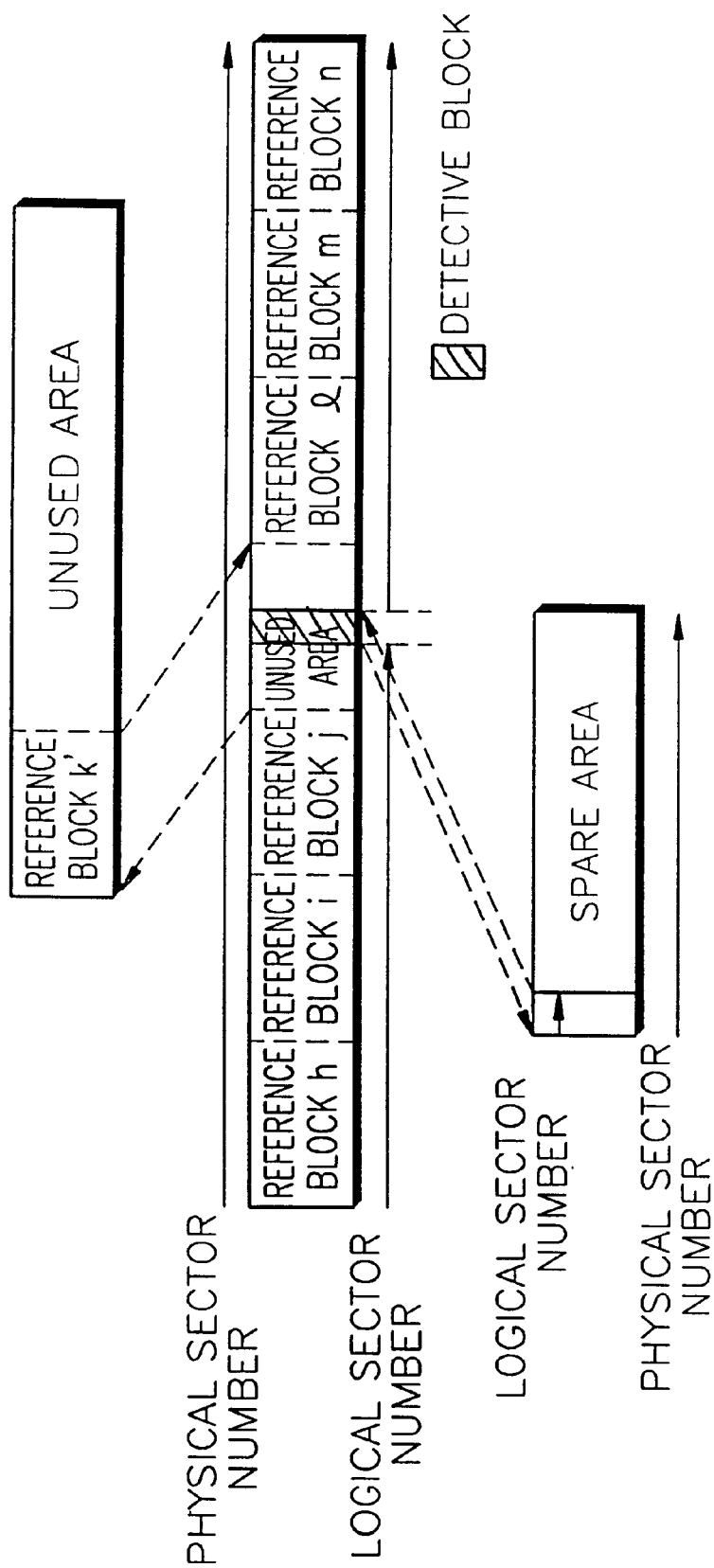
FIG. 3 is a diagram illustrating defect management of a DVD-RAM disc according to one embodiment of the present invention.

In FIG. 3, if A/V data is already recorded in the DVD-RAM disc and an error larger than a predetermined amount is generated in a predetermined sector of the reference block k during defect management for rerecording desired A/V data, defect management is performed in which a driving system moves an ECC block including a defective sector to a spare area, and a logical sector number is reassigned to the spare area, to thereby suppress data loss.

Similar to conventional defect management using the linear replacement, data loss can be suppressed, but if data of the defective ECC block of a subsequent spare area is reproduced, real-time reproduction cannot be performed due to mechanical seek operation in a unit of a reference block. Accordingly, in order to record and reproduce the A/V data, regulation of defect management of a DVD-RAM physical format has additional exceptional rules to ensure real-time reproduction.

The physical regulation must be uniform if any data is recorded or reproduced on or from the disc. Thus, in the present invention, additional defect management is performed for real-time recording or reproduction of A/V data after defect management using linear placement. That is, data of a reference block k including a defective ECC block moves to a reference block k' of an additional unused area, and a reproduction sequence of the A/V data in an additional information file area of j k l is updated to j k' l, where the updated reproduction sequence can indicate information for real-time reproduction. Here, the unused area indicates the user area in which no data is recorded or current edition and rewriting is not performed.

The reference block k of the user area is assigned to the unused area. In the unused area, information including the defect area, as well as position information assigned to the unused area, are stored in an information file area for additional management so that the defective unused area is not used for recording subsequent A/V data, but rather used for additional recording of information regardless of real-time recording or reproduction.

In order to obtain compatibility with the conventional method of defect management, the defective reference block which is moved to the unused area according to the embodiment of the present invention, may be moved to the spare area. Further, the ECC block, including the defective sector which is managed by the conventional method using linear replacement, may be managed by the method for managing defects using slipping replacement during initialization of the disc.

As described above, according to the present invention, video and audio data are recorded on or reproduced from a rewritable medium, to thereby ensure real-time reproduction without changing the method for managing defects which are physical regulations of the medium.

What is claimed is:

1. A rewritable recording medium comprising:
   a user area where audio and/or video (A/V) data is recorded in a reference block unit of a predetermined size; and
   a spare area for managing defects, wherein in a defect management process for checking whether a defective data block is detected from the recording medium, a defective data block is moved to the spare area by a predetermined defect management method, the reference block including the defective data block is moved to an unused area, and additional information for managing defects of the reference block moved to the unused area is stored in a predetermined information area.

2. The recording medium of claim 1, wherein the reference block comprises a predetermined number of sectors which are determined with reference to a bit rate of data in recording and reproduction, a seek time depending on mechanical performance of a driving system driving the recording medium, and an amount of information stored in a buffer for recording and reproduction.

3. The recording medium of claim 1, wherein the data block is an error correction code (ECC) block, and the predetermined defect management method is linear replacement.

4. The recording medium of claim 1, wherein the additional information comprises real-time reproduction information obtained by updating a reproduction sequence for the moved reference block based on the position of the recorded A/V data.

5. The recording medium of claim 4, wherein the reference block including the defective data block is assigned to an unused area, and position information assigned to the unused area and information regarding the defective data block is further stored in the predetermined information area as the additional information.

6. The recording medium of claim 5, wherein the assigned unused area is used as an information area regardless of real-time recording and reproduction.

7. A method for managing defects during recording and reproduction of audio and/or video (A/V) data on a rewritable recording medium, comprising the steps of:

(a) processing a defective data block while checking for defects of the recording medium where the A/V data is recorded in a reference block unit of a predetermined size, in a predetermined defect management method; and (b) moving the reference block including the defective data block to an unused area from a user area, and recording additional information for managing defects of the reference block moved to the unused area on a predetermined information area of the recording medium.

8. The method of claim 7, further comprising the steps of:

(c) assigning the reference block including the defective data block to the unused area; and (d) recording information for an assigned unused area and information including the defect area on a predetermined information area.

9. The method of claim 8, wherein the assigned unused area is an information area regardless of real-time recording and reproduction.

10. The method of claim 7, wherein the reference block comprises a predetermined number of sectors which is determined with reference to a bit rate of data in recording and reproduction, a seek time depending on mechanical performance of a driving system driving the recording medium, and an amount of information storing a buffer for recording and reproduction.

11. The method of claim 7, wherein the additional information includes real-time reproduction information in which a reproduction sequence for the moved reference block is updated based on a position of the recorded A/V data.

12. The method of claim 7, wherein step (a) comprises the substeps of:

(a1) moving a defective data block to a spare area for managing defects; and (a2) recording defective data block information including a start sector number of the defective data block and a start sector number of the data block of the spare area on a secondary defect list area of a system area of the recording medium.

* * * * *